(12) United States Patent
Chen

(10) Patent No.: US 7,860,037 B2
(45) Date of Patent: Dec. 28, 2010

(54) TELECOMMUNICATIONS SYSTEM AND METHOD FOR COMMUNICATING INTERNET PACKETS BETWEEN AN EXTERNAL PACKET DATA COMMUNICATIONS NETWORK AND A PACKET RADIO NETWORK

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 751 days.

(21) Appl. No.: 10/560,915

(22) PCT Filed: May 17, 2004

(86) PCT No.: PCT/GB2004/002103

§ 371 (c)(1), (2), (4) Date: Dec. 16, 2005

(87) PCT Pub. No.: WO2004/114626

PCT Pub. Date: Dec. 29, 2004

(65) Prior Publication Data

US 2008/0117841 A1  May 22, 2008

(30) Foreign Application Priority Data

Jun. 16, 2003  (GB)  .................. 0313885.6

(51) Int. Cl.
*H04B 7/00* (2006.01)

(52) U.S. Cl. ............... 370/310; 370/338; 370/349; 370/395; 370/367; 370/962; 370/466; 370/329; 370/401; 370/400; 370/497; 370/328; 370/338.3; 709/236; 709/249; 455/435; 455/466; 455/439; 455/414.1

(58) Field of Classification Search ............... 370/338, 370/349, 395.52, 367, 902, 466, 329, 401, 370/400, 497, 328; 709/236, 249; 455/435.1, 455/414.1, 466, 439, 440
See application file for complete search history.

(56) References Cited

U.S. PATENT DOCUMENTS 6,529,143 B2 * 3/2003 Mikkola et al. .......... 340/995.1

(Continued)

FOREIGN PATENT DOCUMENTS

EP  1 353 479 A1  10/2003

(Continued)

OTHER PUBLICATIONS

Xiaobao Chen et al., "MIPv6 Inter-working with Packet Filtering", Jun. 17, 2003.

(Continued)

*Primary Examiner*—Rafael Pérez-Gutiérrez
*Assistant Examiner*—Joseph Arevalo
(74) *Attorney, Agent, or Firm*—Haverstock & Owens LLP (57) ABSTRACT

A telecommunications system for communicating internet packets between a correspondent node and a mobile node. The system comprises a packet radio network providing packet data bearers for communicating internet packets with nodes. Each of the bearers is defined with respect to a source address of the internet packets, the packet radio network including a gateway support node (GGSN) to provide an interface between the external network and the packet radio network. The GGSN detects whether an internet packet is for providing a binding update to the correspondent node of a first source address of the mobile node to a care-of-address of the mobile node. If the internet packet is a binding update, the GGSN allows egress of internet packets sent from the correspondent node. By allowing egress of packets from the correspondent node having this care-of-address as the destination address, a measure of security is provided.

44 Claims, 7 Drawing Sheets

U.S. PATENT DOCUMENTS

| | | | |
|---|---|---|---|
| 7,380,124 B1 * | 5/2008 | Mizell et al. | 713/171 |
| 2002/0036983 A1 | 3/2002 | Widegren et al. | 370/230.1 |
| 2002/0049059 A1 * | 4/2002 | Soininen et al. | 455/439 |
| 2002/0071417 A1 | 6/2002 | Nakatsugawa et al. | 370/338 |
| 2002/0102999 A1 * | 8/2002 | Maggenti et al. | 455/518 |
| 2002/0122432 A1 * | 9/2002 | Chaskar | 370/466 |
| 2003/0002468 A1 * | 1/2003 | Khalil et al. | 370/338 |
| 2003/0016655 A1 | 1/2003 | Gwon | 370/352 |
| 2003/0026241 A1 * | 2/2003 | Ono et al. | 370/349 |
| 2003/0120135 A1 * | 6/2003 | Gopinathan et al. | 600/300 |
| 2003/0169771 A1 * | 9/2003 | Ahn et al. | 370/497 |
| 2004/0004967 A1 * | 1/2004 | Nakatsugawa et al. | 370/400 |
| 2004/0008650 A1 * | 1/2004 | Le et al. | 370/338 |
| 2004/0024787 A1 * | 2/2004 | Edwards et al. | 707/200 |
| 2004/0032865 A1 * | 2/2004 | Kwon | 370/367 |
| 2004/0057449 A1 * | 3/2004 | Black | 370/432 |
| 2004/0148425 A1 * | 7/2004 | Haumont et al. | 709/236 |
| 2004/0199914 A1 * | 10/2004 | Aerrabotu et al. | 718/100 |
| 2004/0203640 A1 * | 10/2004 | Molander et al. | 455/414.1 |
| 2004/0218785 A1 * | 11/2004 | Kim | 382/105 |
| 2004/0248573 A1 * | 12/2004 | Wandel | 455/435.1 |
| 2005/0036471 A1 * | 2/2005 | Singh et al. | 370/338 |
| 2005/0232220 A1 * | 10/2005 | Evans | 370/349 |
| 2006/0070108 A1 * | 3/2006 | Renkis | 725/105 |

FOREIGN PATENT DOCUMENTS

| | | |
|---|---|---|
| GB | 2403097 A * | 12/2004 |
| WO | WO 00/54475 | 9/2000 |
| WO | WO 01/76188 A2 | 10/2001 |
| WO | WO02/58342 * | 1/2002 |
| WO | WO 02/058342 * | 7/2002 ......... 370/328 |

OTHER PUBLICATIONS

Xiaobao Chen et al., "MIPv6 Inter-working with Packet Filtering", Feb. 21, 2003.

"Digital cellular telecommunications system (Phase 2+); Universal Mobile Telecommunications System (UMTS); End to end quality of service concept and architecture", pp. 1-48, version 5.4.0 Release 5.

* cited by examiner

DOWN-LINK INTERNET PACKET (MN→CN)

UP-LINK INTERNET PACKET (CN→MN)

BINDING UPDATE

BINDING UPDATE ACKNOWLEDGEMENT

TELECOMMUNICATIONS SYSTEM AND METHOD FOR COMMUNICATING INTERNET PACKETS BETWEEN AN EXTERNAL PACKET DATA COMMUNICATIONS NETWORK AND A PACKET RADIO NETWORK

FIELD OF THE INVENTION

The present invention relates to telecommunications systems for communicating internet packets between a mobile communications user equipment forming a correspondent node and a mobile node via an external packet data communications network. More particularly, the present invention relates to gateway support nodes for communicating internet packets between an external packet data communications network and a packet radio network.

In one embodiment the gateway support node forms a gateway for a General Packet Radio System (GPRS) network, known as a GPRS Gateway Support Node (GGSN).

BACKGROUND OF THE INVENTION

The General Packet Radio Service (GPRS) has been developed for communicating efficiently data packets to and from mobile user equipment via a second generation mobile radio network such as the Global system for Mobiles (GSM) or a third generation mobile radio network such as the Universal Mobile Telecommunications System (UMTS). GPRS provides support for a packet-orientated service, which attempts to optimise network and radio resources for packet data communications such as for example Internet Packets (IP). The GPRS provides a logical architecture, which is related to the circuit switched architecture of the second or third generation mobile radio network.

Generally, the GPRS network will be connected to another packet data telecommunications network, which may also be connected to further packet data telecommunications network. The network to which the GPRS network is connected will be referred to in the following description as an external network. The GPRS network for communicating data between a mobile communications user equipment (UE) and the external network comprises: a gateway support node (GGSN) which provides an interface between the external network and the user equipment. The GPRS network also includes a service support node (SGSN) which is operable to control communication of data packets between the gateway support node and the user equipment using a radio network controller (RNC) which controls radio resources of the telecommunications network.

The Internet Protocol as developed by the Internet Engineering Task Force (IETF) has become a preferred way of communicating packet data via telecommunications networks. Whilst version 4 of the Internet Protocol (Ipv4) has been standardised and has been deployed in many fixed networks, version 6 of the Internet Protocol is being developed in order to provide improved facilities. Amongst these improvements is a facility to communicate internet packets to and from mobile nodes, which roam from a home network to foreign network during an IP session [1]. Generally, following a process known as route optimisation which will be described shortly, a source and a destination address in the header of IP data packets being set from and to a mobile node (MN) respectively will change as a result of the MN roaming to the foreign network.

The mobile node may communicate Internet packets with a correspondent node (CN) which is attached to a GPRS network. As a result the GGSN of the GPRS network must be arranged to route the internet packets via an appropriate bearer to the correspondent node, which itself may be mobile. If the mobile node roams to a foreign network mid-session then the GGSN must be arranged to route the internet packets to the correspondent node (mobile user equipment) via an appropriate bearer. The appropriate bearer will have been set up by the GGSN when a session initiation was established at a time when the mobile node was attached to its home network. As such the parameters for the bearer will have been established with reference to a home address of the mobile node as the source address. However as explained above, the source address in the header of the internet packets will change during the session from the home address of the mobile node, when attached to its home network, to a care-of-address after the mobile node roams to the foreign network. Without adaptation, the GGSN will therefore drop internet packets with the care-of-address of the mobile node as source address rather than routing the packets via the bearer established for the mobile node's home address to the correspondent node.

It has previously been proposed to provide a mobile node's home address in an extension header field known as the hop-by-hop field. As such the GGSN will be able to identify the appropriate bearer through which internet packets can be routed to a correspondent node (CN) attached to the GPRS network, because the mobile node's home address provides the source address with respect to which the appropriate bearer was set up. Generally, however there remains a technical problem to improve inter-working between the Internet Protocol, in particular but not exclusively Ipv6 and a packet radio system such as but not exclusively the GPRS.

SUMMARY OF INVENTION

According to the present invention there is provided a telecommunications system for communicating internet packets between a mobile communications user equipment forming a correspondent node and a mobile node via an external packet data communications network. The system comprises a packet radio network operable to provide a plurality of packet data bearers for communicating the internet packets with nodes attached to the packet radio network. Each of the bearers is defined with respect to a source address of the internet packets, the packet radio network including a gateway support node (GGSN) operable to provide an interface between the external network and the packet radio network. The gateway support node (GGSN) is operable to detect whether an internet packet is for providing a binding update to the correspondent node of a first source address of the mobile node to a care-of-address of the mobile node, and if the internet packet is a binding update, to allow egress of internet packets sent from the correspondent node having the care-of-address of the mobile node as the destination address from the gateway support node to the external network.

Embodiments of the present invention address a technical problem associated with a potential theft of service which may occur if an unscrupulous user of a mobile user equipment attempts to use resources on a telecommunications network such as the GPRS network or another data communications network to which the GPRS network is connected. The theft of service may occur if the user uses an unauthorized destination address for Internet packets sent from the mobile user equipment acting as correspondent node. An unauthorized address might be for example an address which can be used to communicate internet packets, using resources on a GPRS/

UMTS network or other network for which a user has not subscribed. In order to prevent such a theft of service, a security function within the GGSN known as Service Based Local Policy is used to form a gate, and is arranged to allow internet packets to pass out from the gateway support node if the destination address has been authorized.

As explained above, the hop-by-hop extension header field of an Ipv6 packet is arranged to include the home address of a mobile node which has roamed to a foreign network and therefore has a care-of-address as the destination address for Internet packets sent from the correspondent node. In order to allow legitimate data packets to pass to a neighbouring telecommunications network to which the gateway support node is connected, the gateway support node is arranged to examine the hop-by-hop field as well as the destination address field in the Internet packet header. If the hop-by-hop field or the destination address field includes a legitimate address, then the Internet packet is allowed to pass through the gateway support node to an external network. A technical problem is thereby created in reducing the likelihood of a theft of service, if the unscrupulous user arranges for internet packets to include an unauthorized destination address in the destination address field, whilst including the mobile node's home address in the hop-by-hop field. This is because the SBLP function in the GGSN should be arranged to drop Internet packets in a situation where the destination address is unauthorized, even if the hop-by-hop field includes an mobile node's home address which is legitimate.

Embodiments of the present invention provide a telecommunications system in which the gateway support node is arranged to identify a care-of-address of a mobile node in association with the home address of that mobile node. The care-of-address is identified following receipt of a binding update message, which is required for route optimisation. The mobile node's care-of-address is then made available to the security function of the gateway support node. In order to reduce the likelihood of a successful theft of service attack, a security function in the gateway support node is arranged to allow the Internet packets to pass only if both the mobile node's home address in the hop-by-hop field and the mobile node's care-of-address are legitimate. To this end, the gateway support node may store the care-of-address provided from a binding update message in association with the mobile node's home address.

Various further aspects and features of the present inventions are defined in the appended claims. These aspects include a gateway support node and a method of communicating internet packets.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE PREFERRED EMBODIMENTS

Mobile Packet Radio Network Architecture

Figure 1:
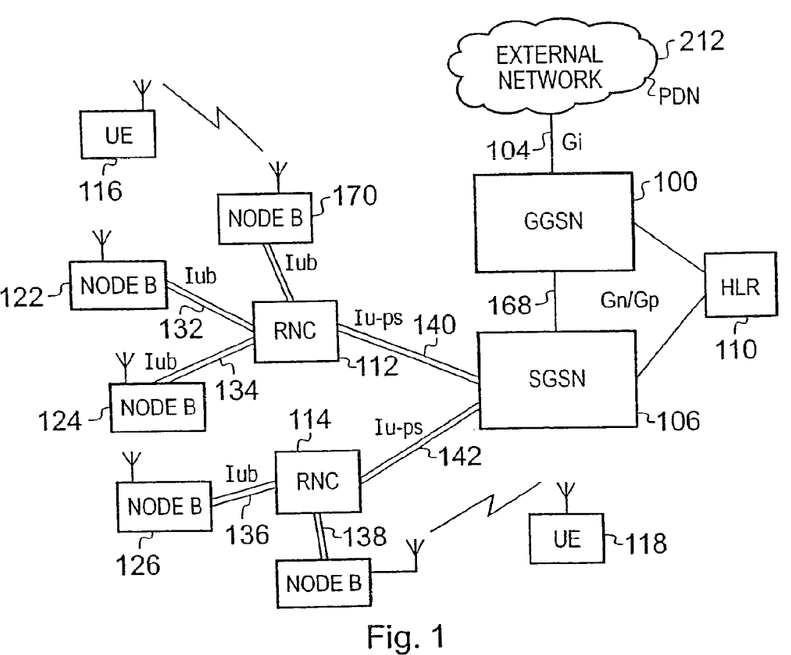
FIG. 1 schematically illustrates an example architecture of a mobile radio network which is arranged to support packet data communications.

An example architecture of a packet radio network which is arranged to support packet data communications is provided in FIG. 1 and explained in more detail in Annex 1. To assist in understanding and explaining the embodiments of the present invention and the advantages provided by such embodiments, a brief description will be provided here. The packet radio network presented in FIG. 1 illustrates an arrangement which conforms to the GPRS/UMTS standard and provides a packet radio network for communicating internet data packets with nodes which are attached to the network via terrestrial radio bearers referred to as UTRAN. The packet radio network includes a Gateway Support Node (GGSN) which is operable to provide an interface between an external network PDN and the nodes attached to the GPRS/UMTS network. Since the nodes are communicating via the UTRAN radio interface they may be generally mobile nodes. However in the following description the mobile user equipment (UE) which are attached to the packet radio network will be referred to as correspondent nodes CN. As will be explained shortly, the GPRS/UMTS network provides a plurality of packet data bearers for communicating internet packets from the GGSN to the correspondent nodes CN and from the correspondent nodes CN to the GGSN. Typically, packets received from correspondent nodes by the GGSN are allowed to egress from the packet radio network to the external packet communications network PDN. These packets may be destined for other nodes which may be attached to the external network PDN or may be attached other networks, the packets reaching these nodes via the external network PDN.

IP Route Optimisation

Route optimisation is a known as part of the internet protocol standard version 6 (IPV6) and may be performed for a node which roams from a home network to a foreign network. The route optimisation is a process by which a node which changes its affiliation from a home network to a foreign network can be arranged to communicate internet packets to and from the node via the foreign network without being routed via the home network. A node which changes its affiliation by roaming from its home network to a foreign network will be referred to in the following description as a mobile node.

Figure 2:
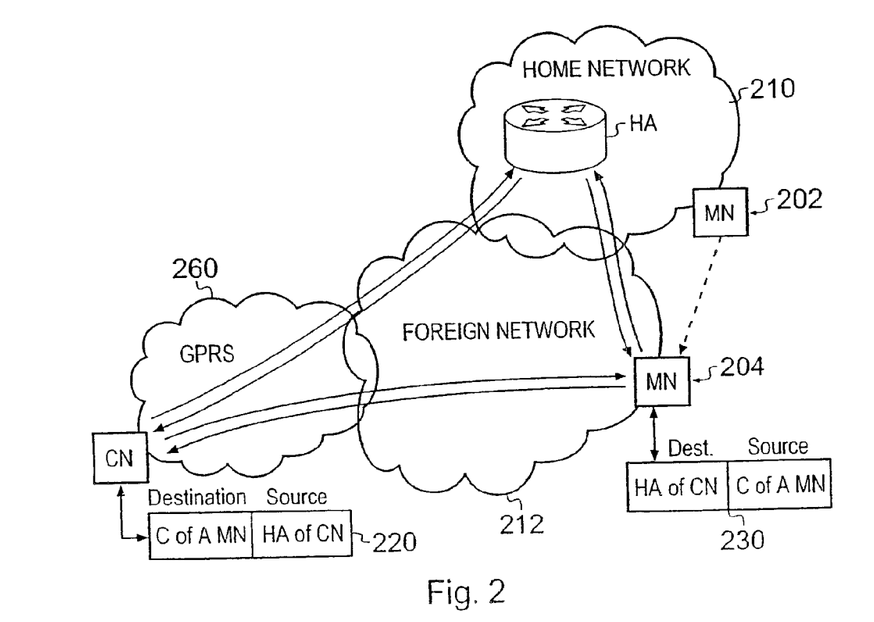
FIG. 2 schematically illustrates a mobile node communicating with a correspondent node via a home network and after roaming to a foreign network performing a route optimisation procedure.

As is conventional with the internet protocol, nodes which communicate internet packets between each other provide the destination address as well as the source address in the internet packet header. FIG. 2 provides an illustration of a route optimisation process between a correspondent node CN attached to a GPRS network and a mobile node MN. In FIG. 2 the correspondent node CN is communicating internet packets to and from the mobile node MN whilst the correspondent network CN is affiliated with a GPRS/UMTS network 260. As illustrated by two positions of the mobile node MN 202, 204, the mobile node which was originally communicating internet packets with the correspondent network CN via its home network 210 moves to a foreign network 212. Thus originally the mobile node MN was communicating internet packets via its home agent HA. When the mobile node MN moves from the home network 210 at position 202 to a foreign network 212 at position 204 internet packets according to a conventional operation of Ipv4 would have to be routed via the home agent. That is to say the destination address for packets sent to the mobile node MN would be its home address, and the source address of packet sent from the mobile node MN would be its home address. As such, internet packets would have to be routed via the foreign network 212 and the home network 210 to and from the correspondent node CN via the GPRS/UMTS network 200. It will be appreciated that routing packets via the home agent after the mobile node MN has roamed to the foreign network consumes network resources unnecessarily and further increases the delay in communication of the internet packets.

As mentioned above, route optimisation is a process by which internet packets are communicated between the correspondent node CN and the mobile node MN without having to pass through the home agent HA thereby reducing the resources used to communicate the internet packets. Typically a delay in communicating packets is also reduced.

Figure 3:
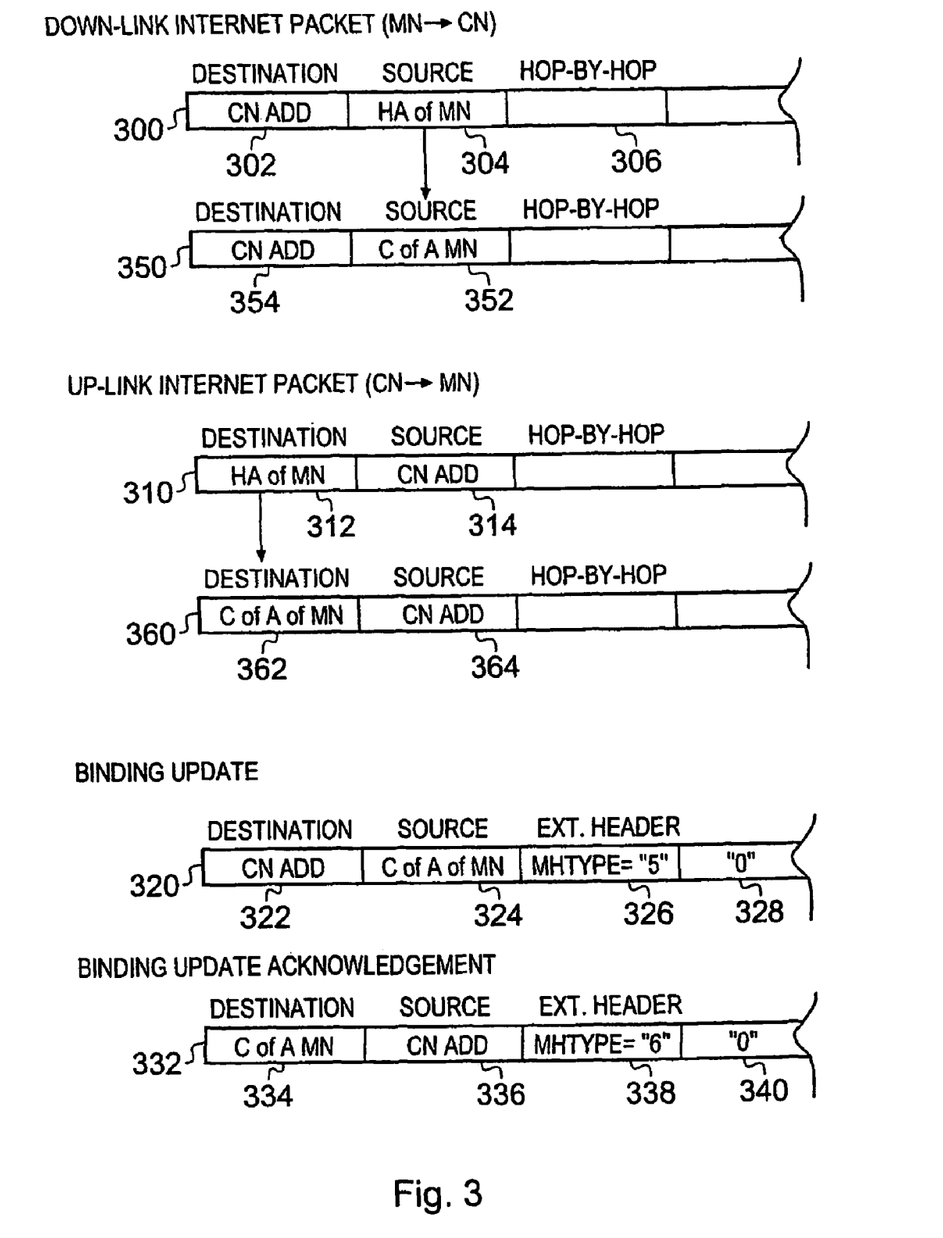
FIG. 3 schematically illustrates example internet packets at different stages in the route optimisation procedure.

FIGS. 2 and 3 effectively provide a summary of relevant parts of the route optimisation process which will be useful in understanding the embodiments of the present invention which will be described shortly. FIG. 3 provides an example illustration of Internet packet headers before and after route optimisation. In FIG. 3 internet packet 300 provides an illustration of an internet packet (IP) header to be sent from the mobile node MN when attached to the home network at position 202 to the correspondent node CN when attached to the GPRS network 260. The Internet packet header 300 includes the address of the correspondent node CN within a destination field 302 and the home address of the mobile node (MN) within a source address field 304. The Internet packet header 300 also includes a further field known as the hop-by-hop field 306 which will be explained shortly. The IP header 300 for communication from the mobile node (MN) to the correspondent node (CN) is known as a down-link internet packet.

For the up-link, that is to say from the correspondent node CN to the mobile node MN, an Internet packet header 310 is shown to include within the destination field 312 the home address of the mobile node MN and within the source address field 314 the address of the correspondent node CN.

Following route optimisation in accordance with a change of affiliation of the mobile node, the mobile node MN must inform the correspondent node of its new address. The new address, that is the address to be used to access the mobile node MN via the foreign network, is known as the care-of-address. To inform the correspondent node CN of the care-of-address of the mobile node MN, the mobile node. MN sends the correspondent node CN a binding update message.

An example of binding update message is shown in FIG. 3 by a representation of an internet packet header 320. As before the destination address field 322 in the IP header 320 contains the address of the correspondent node CN, whereas the source address field 324 uses the care-of-address of the mobile node MN. An extended header field 326 provides a Mobile Header (MH) type with a value equal to "5" indicating that the internet packet provides a binding update. The payload field 328 contains the value of "0". The binding update internet packet 320 is sent from the mobile node MN to the correspondent node CN.

In response to the binding update the correspondent node CN updates its cache address store. The cache stores the care-of-address of the mobile node MN in association with the original home address of the mobile node. The correspondent node CN then responds to the binding update 320 by sending a binding update acknowledgement in the form of an Internet packet header 332. The binding update acknowledgement 332 contains the care-of-address of the mobile node MN in the destination address field 334 and the address of the correspondent node CN in the source address field 336. The binding update acknowledgement message is distinguished from the binding update message by the MH type field being set equal to "6" as shown in extension header field 338. Again, the data field contains the value of "0".

Following the binding update the internet packet header for the down-link 350 now includes the care-of-address of the mobile node MN in the source field 352. Correspondingly, the destination field, of the internet packet sent to the mobile node MN contains the care-of-address of the mobile node in the internet packet header 360.

Should the correspondent node itself change its affiliation either within the network or to a foreign network then correspondingly a binding update would be performed by the correspondent node CN. The cache address store of the mobile node 230 is then updated to include the care-of-address of the correspondent node CN in association with the address of the correspondent node CN with the effect that subsequent Internet packets use the care-of-address of the correspondent node CN in place of the home address of the correspondent node.

Traffic Flow Template (TFT Based Packet Filtering at the GGSN)

Figure 4:
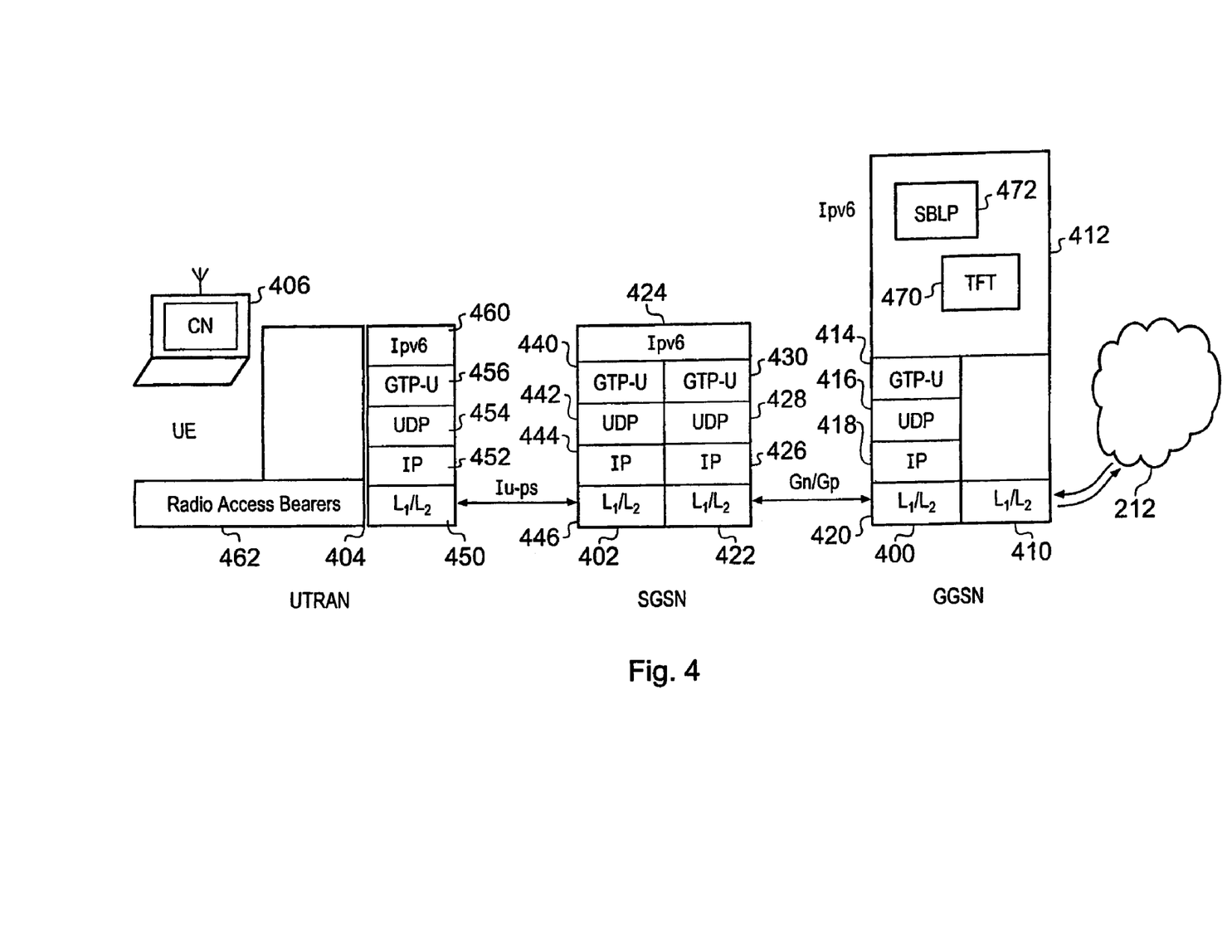
FIG. 4 provides a schematic illustration of parts of a packet radio communications network.

An example embodiment of the present invention will now be described with reference to FIG. 4 which provides elements forming part of the GPRS/UMTS network which appears in FIG. 2. In FIG. 4 a gateway support node (GGSN) 400 is shown together with a Serving GPRS Support Node (SGSN) 402 and a Universal Terrestrial Radio Access Network part (UTRAN) 404. The GGSN 400, the SGSN 402 and the UTRAN 404 form part of the packet radio network as represented in FIG. 1 for communicating data packets to and from mobile User Equipment (UE) 406, which for the illustrative explanation forms the correspondent node CN. The UTRAN 404 includes RNCs and Node Bs as represented in FIG. 1 and provides a facility for communicating packets via a radio access interface formed by the Node B with the UE 406.

FIG. 4 provides an illustration of the protocol stacks which exists within each of the GGSN 400, SGSN 402 and UTRAN 404 for communicating data packets to and from the user equipment 406. To support the following explanation of embodiments of the invention the protocol stacks will be briefly described.

The GGSN 400 forms an interface between the GPRS/UMTS network 260 and the external packet data communications network PDN 212 which in the following explanation forms the foreign network to which the mobile node roams. Internet data packets are received via a physical layer L1/L2 410 and are received at a mobile IP layer which operates in accordance with IPV6 412. To communicate the Internet packets received from the foreign network 212, a GPRS Tunneling Protocol layer GTP-U 414 encapsulates the internet packets and in combination with a User Datagram Protocol (UDP) layer 416 communicates the IP data packet to the SGSN via the interface Gn/Gp using an internet protocol layer 418 and a physical layer L1/L2 420. Correspondingly, within the SGSN in order to provide routing and delivery of the internet protocol packets, packets received via a link layer L1/L2 422 are delivered to a mobile IP layer 424 via a corresponding IP layer 426, a UDP layer 428 and a GTP-U layer 430. The mobile IP layer 424 then routes the IP data packet to the appropriate radio network controller (not shown) which is include within the UTRAN 404. Thus, the IP data packet is tunneled through a further GTP-U layer 440, a UDP layer 442, and an IP layer 444 through a link layer L1/L2 446 via an Iu-ps interface to the corresponding link layer 450 within the UTRAN 404. The IP data packet is then tunneled correspondingly through the IP layer 452, the UDP layer 454 and the GTP-U layer 456 to the mobile IP layer IPV6 460. The Internet packet is correspondingly routed to the appropriate Node B (not shown) where corresponding layers are engaged to communicate the data packet via a radio access bearer layer 462 to the mobile user equipment 406.

As will be appreciated in the up-link direction, that is from the correspondent node CN 406 to the GGSN, corresponding tunneling is employed to route the Internet packets back to the GGSN so that the internet packet can egress from the GPRS/UMTS network 200 to the foreign network 212.

Also included within the GPRS/UMTS elements shown in FIG. 4 in the GGSN 400 is a Traffic Flow Template (TFT) controller 470 and a Service Based Policy (SBLP) controller 472. The TFT 470 and the SBLP 472 operate in accordance with an embodiment of the present invention as will be described shortly to manage the communication of IP data packets from the GGSN to the mobile UE (CN) and from the mobile UE (CN) to the GGSN and outward to the foreign network 212.

In the following description the mobile UE 406 forms the correspondent node CN as represented in FIG. 2, whereas a node from which the UE 406 receives internet data packets and sends internet data packets to forms a mobile node which roams to the foreign network 212 as explained with reference to FIG. 2.

In order to provide an explanation of the embodiments of the present invention the operation of the TFT controller 470 which is shown in FIG. 4 will be briefly described with reference to FIG. 5.

Traffic Flow Template Controller

Figure 5:
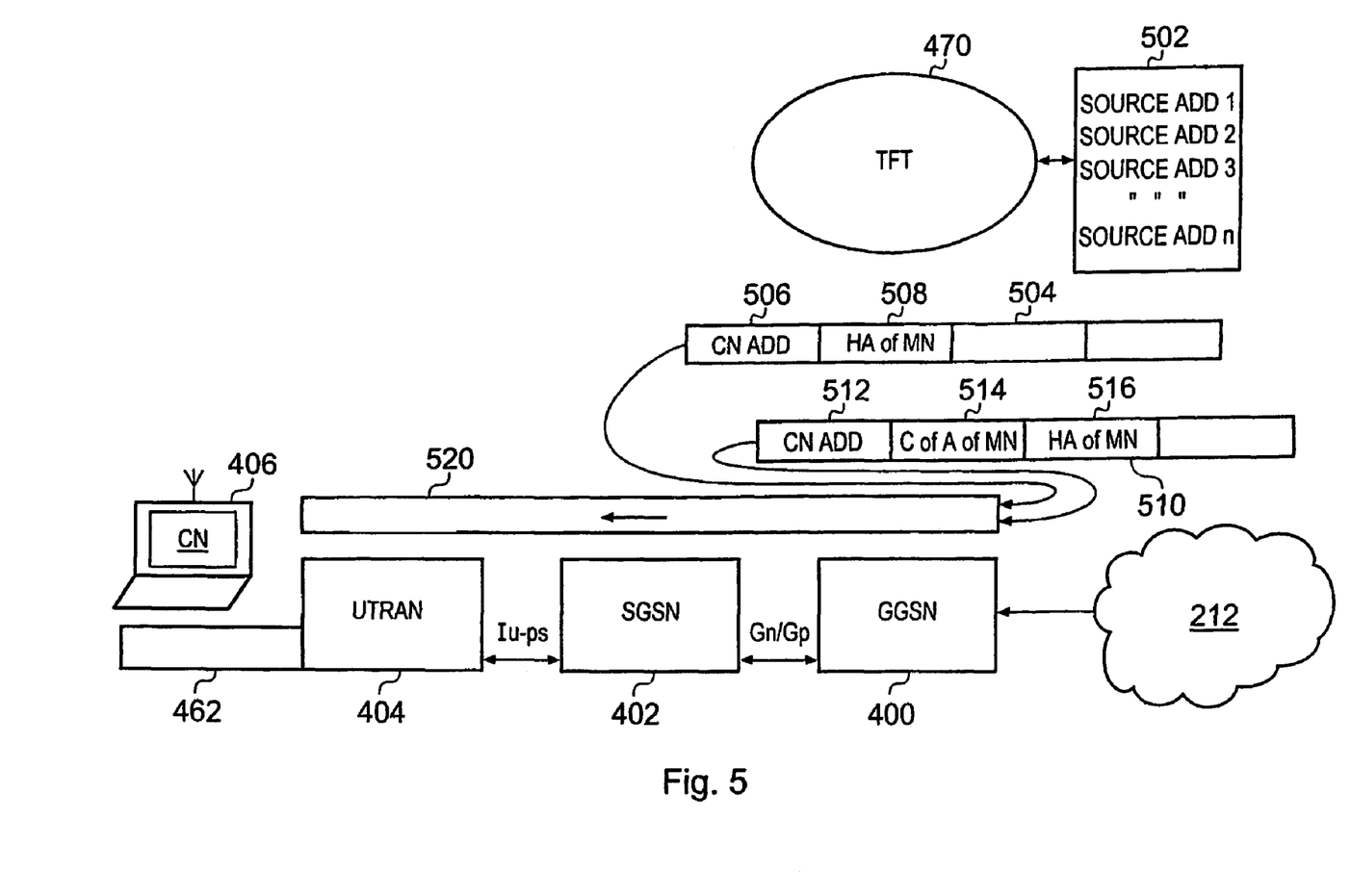
FIG. 5 is a schematic illustration of the parts shown in FIG. 4 illustrating an operation of a gateway support node to communicate down-link packets to a correspondent node.

FIG. 5 provides a simplified representation of elements shown in FIG. 4 in order to provide an explanation of the operation of the TFT controller. In FIG. 5 a simplified representation of the GGSN 400, SGSN 402 and UTRAN 404 are shown to illustrate how internet packets are communicated in the down-link direction, from the mobile node MN to the correspondent node CN. As shown in FIG. 5 the TFT controller 470 which operates in the GGSN mobile IP layer 412 is provided with a list of source addresses 502 which are used to control the communication of IP data packets in accordance with a source address included within the Internet packet header. The TFT 470 arranges to communicate the IP data packets via an appropriate bearer which has been set up using the packet data protocol context activation which may be initiated by an application in the UE (CN), or on the mobile node MN and is analogous to logging onto a required destination.

To select an appropriate UMTS bearer the GGSN to establish a traffic flow template in accordance with the following parameters:

IPV4 source address type
IPV6 source address type
Protocol identifier/next header type
Single destination port type
Destination port range type
Single source port type
Source port range type
Security perimeter index type
Type of service/Traffic class type
Flow level type For each PDP context to be used for a multimedia session a traffic flow template is generated by the mobile terminal and sent to the GGSN which subsequently uses this traffic flow template to filter incoming packets based on information provided in the template. For example, for packets sent from an Ipv6 mobile node, the correspondent node CN will create a traffic flow template which creates the IP address of the mobile node as the Ipv6 source address for packets in the down-link direction.

As shown in FIG. 5 an internet packet 504 received from the external packet data communications network 212 on the down-link, for communication to the correspondent node 406 may include the address of the correspondent node CN in the destination address field 506. The internet packet may include the home address of the mobile node in the source address field 508.

In operation the TFT controller 470 checks the source address of the internet packet against the list 502 and routes the internet packet via the appropriate data bearer which has been set up within the TFT controller for communicating the Internet packet to the respective correspondent node CN. However, what happens when the mobile network roams from its home network 210 to the foreign network 212 as shown in FIG. 2?

As explained with reference to FIG. 3, following route optimisation the source address for the mobile node will be the care-of-address of the mobile node. Thus, after route optimisation has been performed an Internet packet 510 corresponding to the Internet packet 504 will be sent from the mobile node to the GGSN for communication to the correspondent node CN 406. As shown the IP header 510 received from the mobile node MN when attached to the foreign network 212 includes within its destination address field 512 the home address of the correspondent node 406, but within its source address field the care-of-address of the mobile node 514. The TFT has a packet bearer which has been set up and defined for conveying the internet packets to correspondent nodes in respect of the source address. However, the internet packet 510 received from the mobile node after it has roamed to the foreign network 212 will not be recognised by the TFT controller 470 and so the packet will be dropped, unless some adaptation of the GGSN is provided. An adapted GGSN forms an embodiment of the invention.

A previously proposed solution for addressing the inter-working between the TFT controller 500 in the GGSN after route optimisation is to include the home address of the mobile node MN within an extension header field known as the hop-by-hop field 516. By including the home address of the mobile node within the hop-by-hop field 516, the TFT controller can identify the appropriate bearer which should be used to convey an Internet packet to the correspondent node CN. This is the packet bearer, which was set up during a PDP context activation as part of a session initiation. Thus, if the mobile node roams to a foreign network during mid-session then by providing the home address of the mobile node in the hop-by-hop field the TFT controller 500 can identify the appropriate bearer to be used to convey the internet packets to the correspondent node 406. The hop-by-hop address field is also known as the routing header type two (extension to header of IP6 packets).

In summary, by analyzing the hop-by-hop field in combination with the source address field the TFT controller 470 can identify the appropriate bearer 520 to communicate the Internet packets to the correspondent node CN because the list 502 includes the home address of the mobile node. However, a technical problem is presented by providing the home address of the mobile node in the hop-by-hop field, in order that the TFT controller 470 can identify the appropriate IP data bearer. This problem will be explained in the following section.

Inter-Working Mobile IPV6 with SBLP of IMS in GPRS/UMTS

Figure 6:
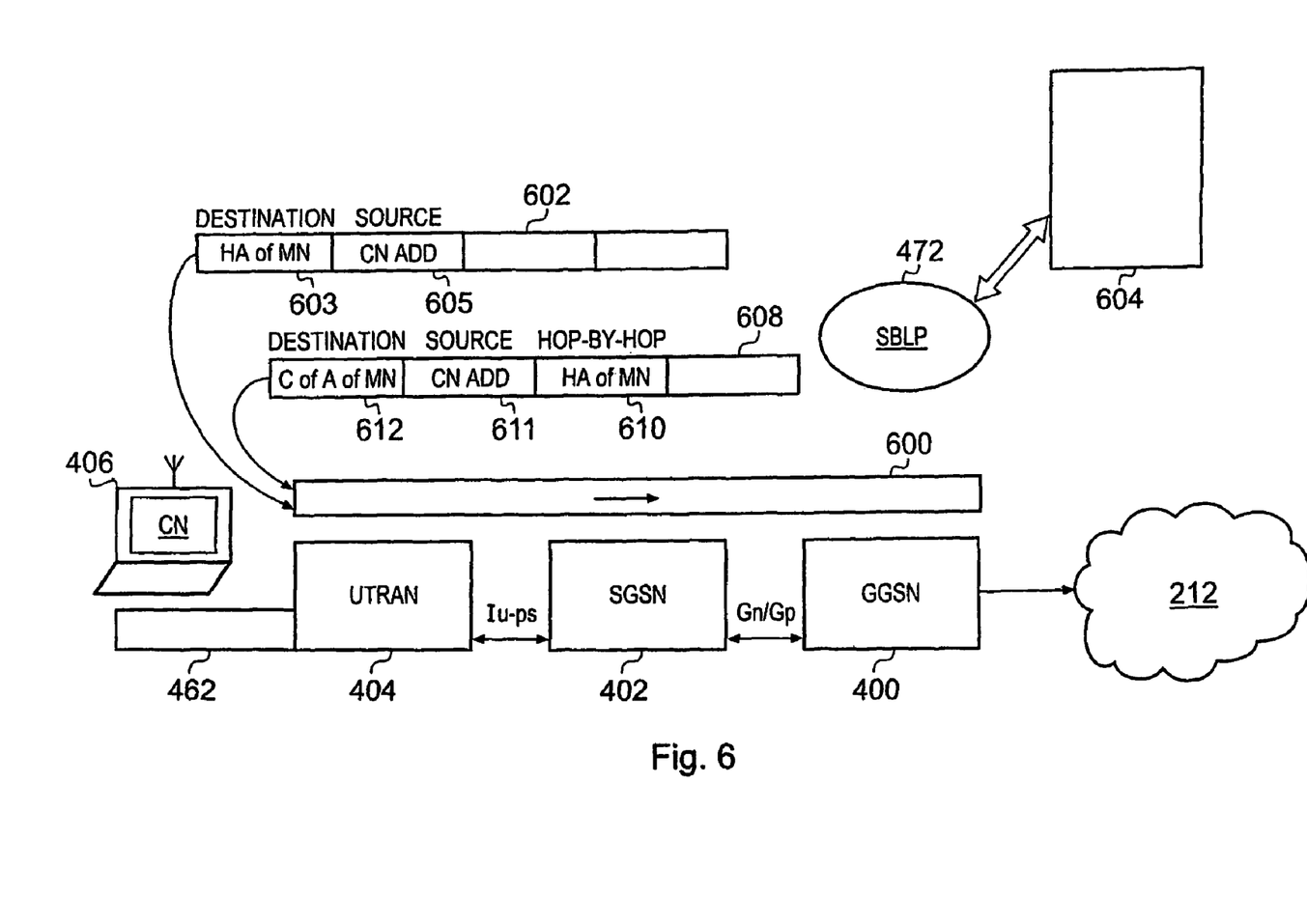
FIG. 6 is a schematic illustration of the parts shown in FIG. 4 illustrating an operation of the gateway support node to communicate up-link packets to egress from the packet radio network.

FIG. 6 provides a simplified diagram of parts of the GPRS/UMTS network shown in FIG. 4 and configured for communicating data packets on the up-link from the correspondent node CN to the mobile node MN as previously discussed with reference to FIG. 5 for down-link communications.

In FIG. 6 a bearer 600 which was initiated by the correspondent node CN using a PDP context activation is provided for up-link communications to the mobile node MN. An example of an Internet packet header 602 communicated with an Internet packet on the up-link is sent through the bearer 600 through the UTRAN 404, the SGSN 402 to the GGSN 400 and outward to the foreign network 212. However, within the GGSN 400, the SBLP is provided in order to police access by the CN (mobile user equipment) to the quality of service resources in the UMTS network and further out into the external packet data communications network 212. As mentioned above, the SBLP 472 operates to effect a policy function as a policy decision point or policy enforcement point in order to prevent theft of service attacks by unscrupulous parties. For example, an unscrupulous party may wish to gain access to IP multimedia subsystem services (IMS) even though the party has not subscribed to the services. One possibility for gaining unauthorized access to UMTS services as a theft of service would be to use an unauthorized address associated with a source or a destination which is unknown or unauthorized by the GGSN network, whilst providing a legitimate address in the hop-by-hop field 306.

For an IMS session that is activated and authorized by the SBLP 472, an SBLP is provided with a data store 604 which is arranged to store information representing a template which contains a mobile node's original home address as the destination address. The SBLP compares the destination address of each up-link data packet as it is communicated from the GGSN to the external network 212 with respect to a set of authorized destination addresses provided within the data store 604. However, if the mobile node MN roams to the foreign network MN then the destination address will now become the care-of-address of the MN. An example of such an IP header 608 which has the care-of-address of the mobile network MN in the destination address field 610 as a result of the mobile node MN roaming during a session 608 is shown in FIG. 6. This IP header 608 includes the care-of-address of the mobile network in the destination field 612.

In order to prevent the SBLP 472 dropping outgoing internet packets communicated from a legitimate correspondent node CN to a mobile node MN the hop-by-hop field is again utilised to contain the original home address of the mobile node. Therefore, as shown in FIG. 6 the up-link data packet 608 is arranged to include the home address of the mobile node MN in the hop-by-hop field option 610. Therefore, since the correspondent node CN uses the care-of-address of the MN but includes the home address of the mobile node MN in the hop-by-hop option header the SBLP 472 in the GGSN 400 can compare the address in the hop-by-hop field with the list of registered addresses within the data store 604. If the hop-by-hop field matches the home address of the mobile node MN, the Internet packet is allowed out through the GGSN 400 to the foreign network 212.

As explained above, an unscrupulous correspondent node (mobile user equipment) operating using Ipv6 may start an IMS session to access IMS services although it may not be authorized or may not have subscribed to such an IMS services. To this end, the unscrupulous party may put the authorized home address of the mobile node in the hop-by-hop field and then include any address in the destination address field whereby the packet may be sent to an unauthorized destination. Since the hop-by-hop field contains an authorized address of the mobile node MN, the packet passes through the SBLP 472 thereby allowing the unscrupulous party access to IMS services and UMTS resources without authorization.

Secure Authorizations Between the TFT with SBLP

Figure 7:
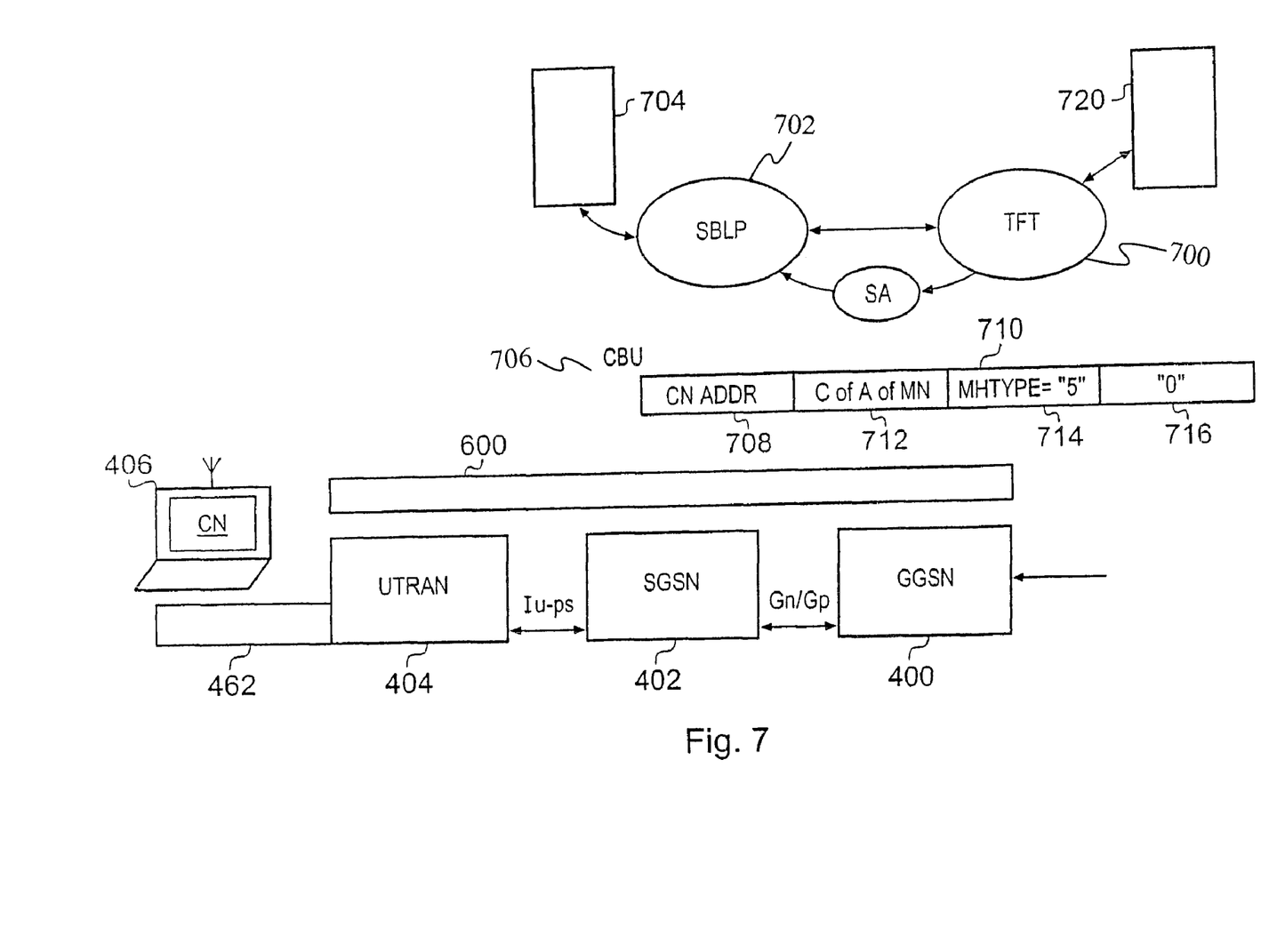
FIG. 7 is a schematic illustration of the parts shown in FIG. 4 illustrating an operation of a gateway support node in accordance with an embodiment of the present invention.

An embodiment of the present invention is illustrated in FIG. 7. FIG. 7 provides a simplified representation of parts of the GPRS network shown in FIG. 4. However, in FIG. 7 the GGSN has been adapted to provide an improvement which reduces a likelihood of a successful theft of service by an unscrupulous party. To this end, the TFT controller 700 is arranged to detect the mobile node's care-of-address and to provide the care-of-address to the SBLP controller 702. The SBLP controller 702 is arranged to allow egress of Internet packets on the up-link if both the hop-by-hop field and the destination address field contain legitimate address. The SBLP is therefore provided with a list of authorized addresses in a data store 704. The operation of the TFT controller 700 and the SBLP controller 702 in accordance with an embodiment of the present invention will now be described.

Following route optimisation during a session the mobile node MN which roams from the home network 210 to the foreign network FN 212 forms a binding update as described above. The corresponding binding update packet 706 is illustrated in FIG. 7 as received at the GGSN 400 by the TFT controller 700. The CBU will use the MN's care-of-address as the source address in the basic Ipv header. The CBU will also carry the mobile node's original home address in the hop-by-hop field 712 so that the TFT controller will allow the CBU to pass through the GGSN. However, upon recognising the CBU 706 as a binding update, the TFT controller 700 will record the source address (mobile node's care-of-address) in the address field 706 in association with the original home address of the mobile node in the list of authorized source addresses provided in the data store 720. The TFT controller 700 is thereby associating the mobile node's care-of-address with the mobile node's home address.

As already explained, the binding update message uses the MH type value equal to "5". When a packet arrives with an un-matching source address with that contained in the list of authorized source addresses provided to the TFT controller 700 the source address is read as the care-of-address of the mobile node 706. Thereafter, all packets which are received at the TFT controller 700 carrying the care-of-address of the mobile node 706 will be identified and sent through the corresponding bearer identified by that care-of-address (source address) as was previously done for the mobile node's home address. However, in order to ensure authentication of the new care-of-address of the mobile node MN, in one embodiment the TFT controller 700 may look for the binding update acknowledgement message from the correspondent node CN.

As explained above, the binding update acknowledgement is identified by the MH type value "6" as defined in MIPV6 draft section 6.1.8 page 36. Therefore, the TFT controller 700 will only use the care-of-address for the mobile node if the TFT controller receives and identifies a binding acknowledgement with a status value of "zero" indicating that the binding update has been accepted.

In an alternative embodiment a secure binding update may be effected by using the mobile IPV6 return routeability procedure between the correspondent node CN and the mobile node (described in mobile IPV6 section 5, section 9.4 and section 14). Thus, for each PDP context established, the associated TFT contains the source address of the mobile node or the care-of-address of the mobile node when the mobile node is attached to a foreign network.

In order to permit access to UMTS resources and an IMS session in which a likelihood of successful theft of service attack from an unscrupulous party is reduced, the SBLP will check each packet accessing IMS services for its destination address. The SBLP controller will check the destination address carried in the basic IPV6 header and the original home address of the MN in the hop-by-hop field option. The packet may only egress from the GGSN if both the destination address matches the mobile node's care-of-address and the address in the hop-by-hop field matches the home address of the mobile node as the destination address in the SBLP information template 704. The GGSN will otherwise block any packets sent from a mobile user equipment (correspondent node) using an unauthorized destination address. To this end, a security associate SA is created in association with the TFT controller 700 and the SBLP controller 702. The security associate SA includes the care-of-address of the mobile node. Following a binding update the mobile node moves to the care-of-address following roaming to a foreign network so that the source address of the mobile node will be the care-of-address of the mobile node MN. Therefore, packets may be only sent out from the GGSN on the up-link from the SBLP if both the hop-by-hop option of up-link packet headers include the home address of the destination which is the mobile node's or the security associate SA provides a care-of-address for the mobile node. The care-of-address of the mobile node MN may be stored with the home address of the mobile node in the data store 704.

Summary of Operation

Figure 8:
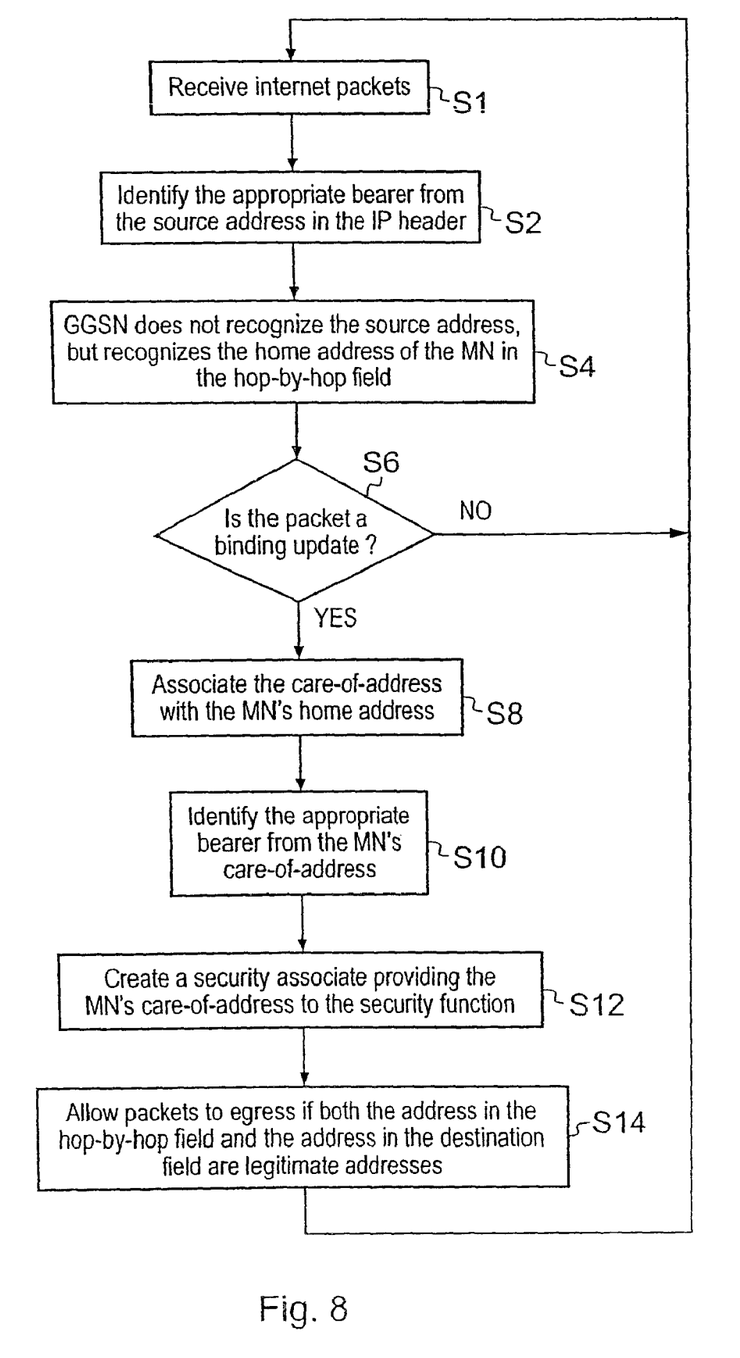
FIG. 8 is a flow diagram illustrating the operation of the gateway support node appearing in FIG. 7.

FIG. 8 provides a flow diagram which illustrated the operation of a gateway support node according to an embodiment of the invention. A description of the flow shown in FIG. 8 is summarized as follows:

S1: Internet packets are received by the GGSN from the external packet data communications network, which are to be communicated to the nodes attached to a packet radio network of which the GGSN forms part. The packet radio network provides a plurality of bearers for communicating the internet packets to the nodes.

S2: The GGSN identifies the appropriate bearer for communicating a received internet packet to a correspondent node from the source address in the source address field of the IP header.

S4: However, if the GGSN does not recognise the source address, then the GGSN examines a hop-by-hop field in an extension of the IP header. If the hop-by-hop field includes an address for which one of the packet bearers was established, then this bearer is used to convey the packet.

S6: The GGSN receives an internet packet and determines whether the internet packet is a binding update.

S8: If the packet is a binding update then the GGSN associates the care-of-address of the mobile node, providing as the source address of the binding update, with the original source address for the mobile node, which may be the mobile node's home address.

S10: Following the association the GGSN may identify the appropriate bearer for communicating down-link packets from the mobile node's care-of-address as the source address.

S12: The GGSN arranges for the mobile node's care-of-address, which was detected in step S8 from the binding update packet to a security function, such as for example a Service Based Local Policy (SBLP). This may be effected for example using a security associate.

S14: The GGSN examines-packets received from the correspondent node for egress from the packet radio network to the external node. The GGSN only allows packets to egress from the packet radio network to the external network, if both the source address contains a legitimate address and the hop-by-hop field contains a legitimate care-of-address.

Optionally, the GGSN may confirm the mobile node's care-of-address detected from the binding up-date packet, by detecting the binding update acknowledgement received back from the correspondent node CN. In alternative embodiments confirmation may be effected by using a reverse routeability confirmation.

Various further aspects and features of the present invention are defined in the appended claims. Various modifications can be made to the embodiments herein described without departing from the scope of the present invention.

REFERENCES

[1] D. Johnson, C. Parkins, J. Arkko "Mobility in Ipv6", Internet Draft, Internet Engineering Task Force, 20 Jan. 2003.

[2] R. Steele, C-C Lee and P. Gould, "GSM, cdmaOne and 3G Systems," published by Wiley International ISBN 0 471 491853

Annex 1

GPRS/UMTS Architecture

The terminology and architecture used in FIG. 1 corresponds to that used for the UMTS and that proposed for 3G as administered by the 3GPP, more details for which may be found in [1]. In FIG. 1, a Gateway GPRS Support Node (GGSN) is connected to an external Packet Data Network 102, (PDN). The external PDN communicates as packets using the Internet Protocol (IP). An interface 104 between the GGSN and the external network is labelled Gi which has been standardised although further aspects are being standardised. Also connected to the GGSN is a Serving GPRS Support Node (SGSN) 106 via an interface 108 labelled as Gn/Gp which is also being standardised.

The GGSN and the SGSN are two of network components, which are required to support GPRS. The GGSN acts as the gateway between the external packet data networks (PDN) and the mobile network, which supports GPRS. The GGSN contains sufficient information to route incoming IP data packets to the SGSN that is serving a particular User Equipment (UE) which is mobile and receives data via a radio access facility provided by the mobile packet radio network. For the example embodiment the radio access facility is provided in accordance with the Universal Terrestrial Radio Access Network (UTRAN) system which is specified in accordance with the 3GPP standard. The SGSN is connected to the GGSN via a Gn interface if the SGSN is within the same Public Land Mobile Network (PLMN), and connected via the Gp interface to GGSNs belonging to other PLMNs.

An SGSN provides mobility management of UEs which are moving within an area supported by the mobile radio network. To this end the SGSN is provided with access to a Home Location Register (HLR) 110. The SGSN is arranged to route data packets to Radio Network Controllers (RNC) 112, 114 for communication via the UTRAN radio access facility to mobile users UE 116, 118. The UTRAN radio access facility is provided using Node B apparatus 120, 122, 124, 126, 128, which effectively form base stations providing radio coverage for the area served by the mobile telecommunications network. The interface 130, 132, 134, 136, 138 between each RNC 112, 114 and the Node B apparatus 120, 122, 124, 126, 128, are labelled Iub and conform to an established or evolving standard. Similarly the interfaces 140, 142 between the SGSN and each RNC 112, 114 are labelled as Iu-ps and is an evolving standard.

The invention claimed is:

1. A telecommunications system for communicating internet packets between a mobile communications user equipment forming a correspondent node and a mobile node via an external packet data communications network, the system comprising:
 a packet radio network operable to provide a plurality of packet data bearers for communicating the internet packets with nodes attached to the packet radio network, each of the bearers being defined with respect to a source address of the internet packets, the packet radio network including a gateway support node operable to provide an interface between the external network and the packet radio network, wherein
 the gateway support node is operable
 to detect whether an internet packet is for providing a binding update to the correspondent node of a first source address of the mobile node to a care-of-address of the mobile node, and if the internet packet is a binding update,
 to confirm the care of address as a legitimate destination address of the mobile node, and
 to allow egress of internet packets sent from the correspondent node having the care-of-address of the mobile node as the destination address from the gateway support node to the external network if the care of address is legitimate and block any internet packets sent from the correspondent node using a destination address which is not legitimate;
 wherein the gateway support node includes a security function operable to control the egress of the internet packets from the packet radio network by comparing the destination address of the internet packet sent from the correspondent node with a list of legitimate destination addresses stored in a data store, the security function allowing egress of the internet packet from the packet radio network if the destination address of the internet packet appears in the list, and otherwise dropping the internet packet, the care-of-address of the mobile node being added to the list upon detecting the binding update.

2. The telecommunications system as claimed in claim 1, wherein the gateway support node is operable to associate the care-of-address with the first source address to the effect that the egress of the internet data packets is allowed in accordance with the egress of internet packets which is allowed for the first source address.

3. The telecommunications system as claimed in claim 2, wherein the first source address is a home address of the mobile node.

4. The telecommunications systems as claimed in claim 3, wherein the internet packet sent from the correspondent node includes the home address of mobile node in an extension field of the header and the care-of-address of the mobile node in the destination address field, and the gate way support node is operable to allow the internet packet to egress from the packet radio network to the external network if both the care-of-address of the mobile node and the home address of the mobile node are legitimate addresses.

5. The telecommunications systems as claimed in claim 2, wherein the internet packet sent from the correspondent node includes the home address of mobile node in an extension field of the header and the care-of-address of the mobile node in the destination address field, and the gate way support node is operable to allow the internet packet to egress from the packet radio network to the external network if both the care-of-address of the mobile node and the home address of the mobile node are legitimate addresses.

6. The telecommunications systems as claimed in claim 1, wherein the internet packet sent from the correspondent node includes the home address of mobile node in an extension field of the header and the care-of-address of the mobile node in the destination address field, and the gate way support node is operable to allow the internet packet to egress from the packet radio network to the external network if both the care-of-address of the mobile node and the home address of the mobile node are legitimate addresses.

7. The telecommunications system as claimed in claim 6, wherein the extension header field is hop-by-hop field as defined in accordance with an Extension Header Type 2 of Ipv6.

8. The telecommunications system as claimed in claim 1, wherein the care-of-address is associated with the first source address if the care-of-address is confirmed as a legitimate address.

9. The telecommunications system as claimed in claim 8, wherein the gateway support node is operable to confirm that the care-of-address is a legitimate address by monitoring internet packets sent from the correspondent node to the mobile node, and
 upon detecting a binding update acknowledgment from the mobile node that the care-of-address has been accepted,
 confirming that the care-of-address of the mobile node is a legitimate address, and thereafter allowing the internet packets to egress from the gateway support node.

10. The telecommunications system as claimed in claim 1, wherein the gateway support node is operable to confirm that the care-of-address is a legitimate address by monitoring internet packets sent from the correspondent node to the mobile node, and
 upon detecting a binding update acknowledgment from the mobile node that the care-of-address has been accepted,
 confirming that the care-of-address of the mobile node is a legitimate address, and thereafter allowing the internet packets to egress from the gateway support node.

11. The telecommunications system as claimed in claim 1, wherein the gateway support node is operable to confirm that the care-of-address is a legitimate address by performing a reverse routability confirmation with the mobile node.

12. The telecommunications system as claimed in claim 1, wherein the gateway support node includes a traffic controller operable
 to compare the first source address in the internet protocol header received from the mobile node via the external network with a plurality source addresses for which the plurality of bearers have been established, to communicate the internet packet to the correspondent node via the appropriate bearer corresponding to the first source address, if a bearer has been established for the first source address, to determine whether an internet packet received from the mobile node is the binding update, and if the internet packet is the binding update, the associating the care-of-address with the first source address includes associating the care-of-address of the mobile node with the packet data bearer defined with respect to the first source address.

13. The telecommunications system as claimed in claim 12, wherein the traffic controller is operable to associate the care-of-address of the mobile node with the first source address by communicating the care-of-address to the security function, the security function being operable to update the list of legitimate destination addresses to include the care-of address of the mobile node.

14. The telecommunications system as claimed in claim 1, wherein the packet radio network is a General Packet Radio System network and the gateway support node is a GPRS Gateway Support Node.

15. The telecommunications system as claimed in claim 14, wherein the traffic controller is a Traffic Flow Template controller operable in accordance with a GPRS standard.

16. The telecommunications system as claimed in claim 15, wherein the security function is effected by a Service Based Local Policy controller operable in accordance with the GPRS standard.

17. The telecommunications system as claimed in claim 14, wherein the security function is effected by a Service Based Local Policy controller operable in accordance with the GPRS standard.

18. A gateway support node for communicating internet packets between an external packet data communications network and a packet radio network, the packet radio network providing a plurality of packet data bearers for communicating the internet packets, each of the bearers being defined with respect to a source address of the internet packets, wherein the gateway support node is operable to detect whether an internet packet is for providing a binding update to the correspondent node of a first source address of the mobile node to a care-of-address of the mobile node, and if the internet packet is a binding update, to confirm the care of address as a legitimate destination address of the mobile node, and to allow egress of internet packets sent from the correspondent node having the care-of-address of the mobile node as the destination address from the gateway support node to the external network if the care of address is legitimate and block any internet packets sent from the correspondent node using a destination address which is not legitimate;

wherein the gateway support node includes a security function operable to control the egress of the internet packets from the packet radio network by comparing the destination address of an internet packet sent from the correspondent node with a list of legitimate destination addresses stored in a data store, the security function allowing the egress of the internet packet from the packet radio network if the destination address of the internet packet appears in the list, and otherwise dropping the internet packet, wherein the care-of-address of the mobile node is added to the list, upon detecting the binding update.

19. The gateway support node as claimed in claim 18, wherein the gateway support node is operable to associate the care-of-address with the first source address to the effect that the egress of the internet data packets is allowed in accordance with the egress of internet packets which is allowed for the first source address.

20. The gateway support node as claimed in claim 19, wherein the first source address is a home address of the mobile node.

21. The gateway support node as claimed in claim 20 wherein the internet packet sent from the correspondent node includes the home address of the mobile node in the extension field of the header and the care-of-address of the mobile node in the destination address field, and the gateway support node is operable to allow the internet packet to egress from the packet radio network to the external network if both the care-of-address of the mobile node and the home address of the mobile node are legitimate addresses.

22. The gateway support node as claimed in claim 19 wherein the internet packet sent from the correspondent node includes the home address of the mobile node in the extension field of the header and the care-of-address of the mobile node in the destination address field, and the gateway support node is operable to allow the internet packet to egress from the packet radio network to the external network if both the care-of-address of the mobile node and the home address of the mobile node are legitimate addresses.

23. The gateway support node as claimed in claim 18, wherein the internet packet sent from the correspondent node includes the home address of the mobile node in the extension field of the header and the care-of-address of the mobile node in the destination address field, and the gateway support node is operable to allow the internet packet to egress from the packet radio network to the external network if both the care-of-address of the mobile node and the home address of the mobile node are legitimate addresses.

24. The gateway support node as claimed in claim 18, wherein the care-of-address is associated with the first source address if the care-of-address is confirmed as a legitimate address, and otherwise not associating the care-of-address with the source address.

25. The gateway support node as claimed in claim 24, wherein the gateway support node is operable to confirm that the care-of-address is a legitimate address by monitoring the internet packet data sent from the mobile node to the correspondent node, and upon detecting a binding update acknowledgment from the mobile node that the care-of-address has been accepted, confirming that the care-of-address of the mobile node is a legitimate address, and thereafter allowing the internet packets to egress from the gateway support node.

26. The gateway support node as claimed in claim 18, wherein the gateway support node is operable to confirm that the care-of-address is a legitimate address by monitoring the internet packet data sent from the mobile node to the correspondent node, and upon detecting a binding update acknowledgment from the mobile node that the care-of-address has been accepted, confirming that the care-of-address of the mobile node is a legitimate address, and thereafter allowing the internet packets to egress from the gateway support node.

27. The gateway support node as claimed in claim 18, wherein the gateway support node is operable to confirm that the care-of-address is a legitimate address by performing a reverse routability confirmation with the mobile node.

28. The gateway support node as claimed in claim 18, including a traffic controller operable
to compare the first source address in the internet protocol header received from the mobile node via the external network with a plurality source addresses for which the plurality of bearers have been established,
to communicate the internet packet to the correspondent node via the appropriate bearer corresponding to the first source address, if a bearer has been established for the first source address,
to determine whether an internet packet received from the mobile node is the binding update, and if the internet packet is the binding update
to associate the care-of-address of the mobile node with the packet data bearer defined with respect to the first source address.

29. The gateway support node as claimed in claim 28, wherein the traffic controller is operable to associate the care-of-address of the mobile node with the first source address by communicating the care-of-address to the security function, the security function being operable to update the list of legitimate destination addresses to include the care-of-address of the mobile node.

30. A method of communicating internet packets between an external packet data communications network and a packet radio network, the packet radio network providing a plurality of packet data bearers for communicating internet packets, each of the bearers being defined with respect to a source address of the internet packets, the method comprising:
detecting whether an internet packet is for providing a binding update to a correspondent node of a first source address of a mobile node to a care-of-address of the mobile node, and if the internet packet is a binding update,
confirming the care of address as a legitimate destination address of the mobile node, and
allowing egress of internet packets sent from the correspondent node having the care-of-address of the mobile node as the destination address from the packet radio network to the external network if the care of address is legitimate and blocking any internet packets sent from the correspondent node using an unauthorized address which is not legitimate by;
comparing the destination address of an internet packet sent from the correspondent node with a list of legitimate destination addresses stored in a data store,
allowing the egress of the internet packet from the packet radio network if the destination address of the internet packet appears in the list, and
otherwise dropping the internet packet, wherein the care-of-address of the mobile node is added to the list upon detecting the binding update.

31. The method as claimed in claim 30, comprising
associating the care-of-address with the first source address to the effect that the egress of the internet data packets is allowed in accordance with the egress of internet packets allowed for the first source address.

32. The method as claimed in claim 31, wherein the first source address is the home address of the mobile node.

33. The method as claimed in claim 32 wherein the internet packet sent from the correspondent node includes the home address of the mobile node in the extension field of the header and the care-of-address of the mobile node in the destination address field, the allowing the internet packet to egress to the external network includes
allowing the internet packet to egress from the packet radio network to the external network if both the care-of-address of the mobile node and the home address of the mobile node are legitimate addresses.

34. The method as claimed in claim 32, comprising
confirming that the care-of-address of the mobile node is a legitimate address for the mobile node before allowing the egress of internet packets in accordance with the destination address.

35. The method as claimed in claim 31, wherein the confirming comprises associating the care-of-address with the first source address if the care-of-address is confirmed as a legitimate address.

36. The method as claimed in claim 35, wherein the confirming comprises
confirming that the care-of-address is a legitimate address by monitoring internet packets sent from the mobile node to the correspondent node, and
upon detecting a binding update acknowledgment from the mobile node that the care-or-address has been accepted,
confirming that the care-or-address of the mobile node is a legitimate address, and
thereafter allowing the internet packets to egress from the gateway support node.

37. The method as claimed in claim 31, wherein the confirming comprises
confirming that the care-of-address is a legitimate address by monitoring internet packets sent from the mobile node to the correspondent node, and
upon detecting a binding update acknowledgment from the mobile node that the care-or-address has been accepted,
confirming that the care-or-address of the mobile node is a legitimate address, and
thereafter allowing the internet packets to egress from the gateway support node.

38. The method as claimed in claim 37, wherein the confirming that the care-of-address is a legitimate address comprises
performing a reverse routability confirmation with the mobile node.

39. The method as claimed in claim 31 wherein the internet packet sent from the correspondent node includes the home address of the mobile node in the extension field of the header and the care-of-address of the mobile node in the destination address field, the
allowing the internet packet to egress to the external network includes allowing the internet packet to egress from the packet radio network to the external network if both the care-of-address of the mobile node and the home address of the mobile node are legitimate addresses.

40. The method as claimed in claim 30, wherein the internet packet sent from the correspondent node includes the home address of the mobile node in the extension field of the header and the care-of-address of the mobile node in the destination address field, the allowing the internet packet to egress to the external network includes
allowing the internet packet to egress from the packet radio network to the external network if both the care-of-address of the mobile node and the home address of the mobile node are legitimate addresses.

41. The method for communicating internet packet data as claimed in claim 30, wherein the packet radio network is a General Packet Radio System network and the gateway support node is a GPRS Gateway Support Node.

42. A computer program providing computer executable instructions, the computer program loaded on to a data processor configuring the data processor to operate as a gateway support node for communicating internet packets between an external packet data communications network and a packet radio network, the packet radio network providing a plurality of packet data bearers for communicating the internet packets, each of the bearers being defined with respect to a source address of the internet packets, wherein the gateway support node is operable to detect whether an internet packet is for providing a binding update to the correspondent node of a first source address of the mobile node to a care-of-address of the mobile node, and if the internet packet is a binding update, to confirm the care of address as a legitimate destination address of the mobile node, and to allow egress of internet packets sent from the correspondent node having the care-of-address of the mobile node as the destination address from the gateway support node to the external network if the care of address is legitimate and block any internet packets sent from the correspondent node using a destination address which is not legitimate;

wherein the gateway support node includes a security function operable to control the egress of the internet packets from the packet radio network by comparing the destination address of the internet packet sent from the correspondent node with a list of legitimate destination addresses stored in a data store, the security function allowing egress of the internet packet from the packet radio network if the destination address of the internet packet appears in the list, and otherwise dropping the internet packet, the care-of-address of the mobile node being added to the list upon detecting the binding update.

43. A computer program having computer executable instructions, the computer program loaded on to a data processor causing the data processor to perform a method comprising:

communicating internet packets between an external packet data communications network and a packet radio network, the packet radio network providing a plurality of packet data bearers for communicating internet packets, each of the bearers being defined with respect to a source address of the internet packets, the method comprising detecting whether an internet packet is for providing a binding update to the correspondent node of a first source address of the mobile node to a care-of-address of the mobile node, and if the internet packet is a binding update, confirming the care of address as a legitimate destination address of the mobile node, and allowing egress of internet packets sent from the correspondent node having the care-of-address of the mobile node as the destination address from the packet radio network to the external network if the care of address is legitimate and blocking any internet packets sent from the correspondent node using a destination address which is not legitimate by:

comparing the destination address of an internet packet sent from the correspondent node with a list of legitimate destination addresses stored in a data store, allowing the egress of the internet packet from the packet radio network if the destination address of the internet packet appears in the list, and otherwise dropping the internet packet, wherein the care-of-address of the mobile node is added to the list upon detecting the binding update.

44. A telecommunications system for communicating internet packets between a mobile communications user equipment forming a correspondent node and a mobile node via an external packet data communications network, the system comprising:

a packet radio network operable to provide a plurality of packet data bearers for communicating the internet packets with nodes attached to the packet radio network, each of the bearers being defined with respect to a source address of the internet packets, the packet radio network including a gateway support node operable to provide an interface between the external network and the packet radio network, wherein the gateway support node is operable to detect whether an internet packet is for providing a binding update to the correspondent node of a first source address of the mobile node to a care-of-address of the mobile node, and if the internet packet is a binding update, to confirm a hop-by-hop field contains a legitimate care-of-address and the source address contains a legitimate address of the mobile node, and to allow egress of internet packets sent from the correspondent node having the care-of-address of the mobile node as the destination address from the gateway support node to the external network if the hop-by-hop field contains the legitimate care-of-address and the source address contains the legitimate address and block any internet packets sent from the correspondent node using a destination address which is not legitimate;

wherein the gateway support node includes a security function operable to control the egress of the internet packets from the packet radio network by comparing the destination address of the internet packet sent from the correspondent node with a list of legitimate destination addresses stored in a data store, the security function allowing egress of the internet packet from the packet radio network if the destination address of the internet packet appears in the list, and otherwise dropping the internet packet, the care-of-address of the mobile node being added to the list upon detecting the binding update.

\* \* \* \* \*